A. E. OSTRANDER.
KNOCKDOWN CAR.
APPLICATION FILED JULY 3, 1912.
1,122,411.
Patented Dec. 29, 1914.
7 SHEETS—SHEET 1.
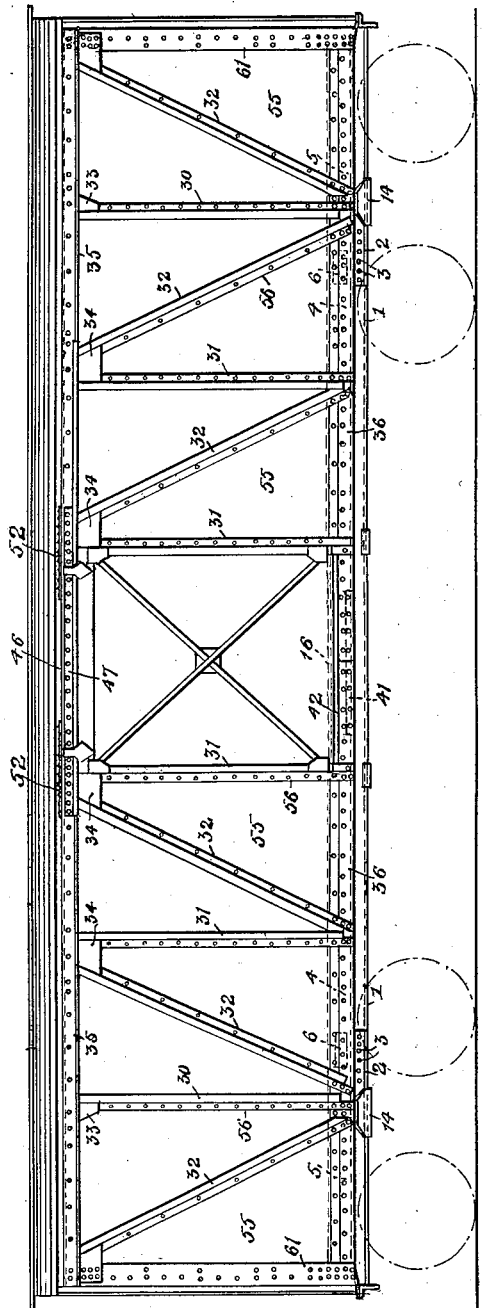
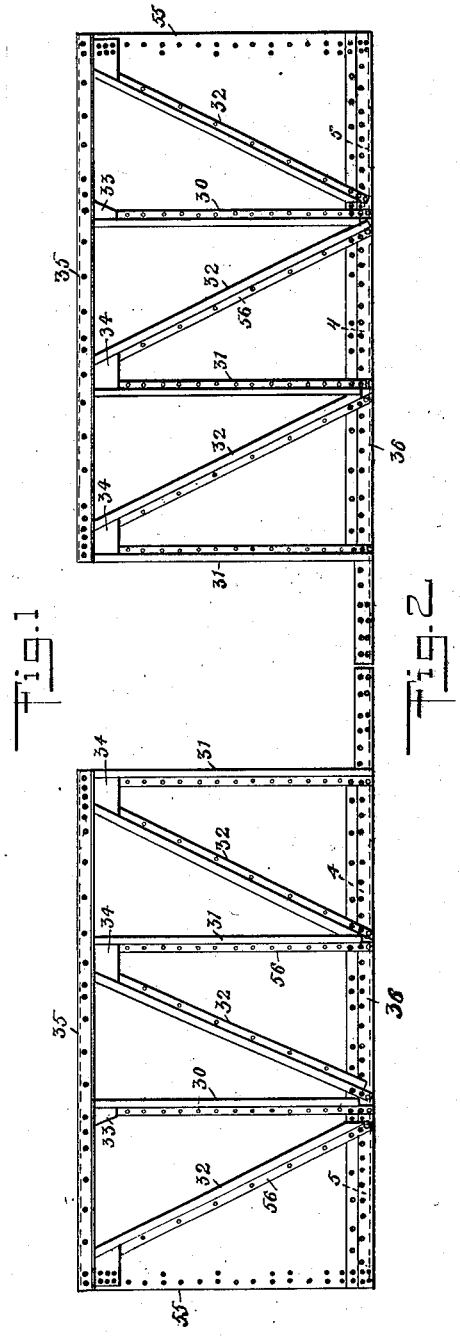

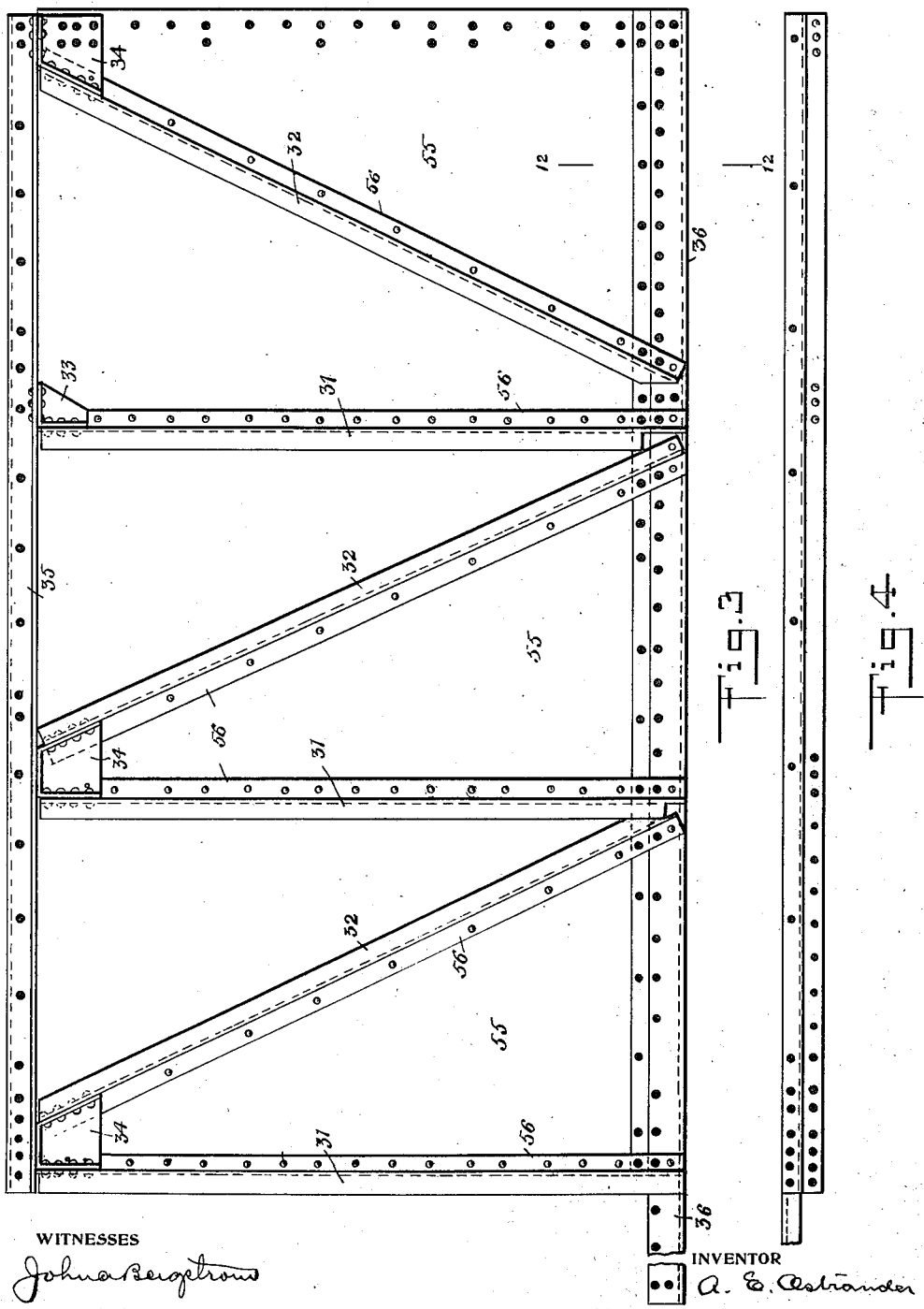

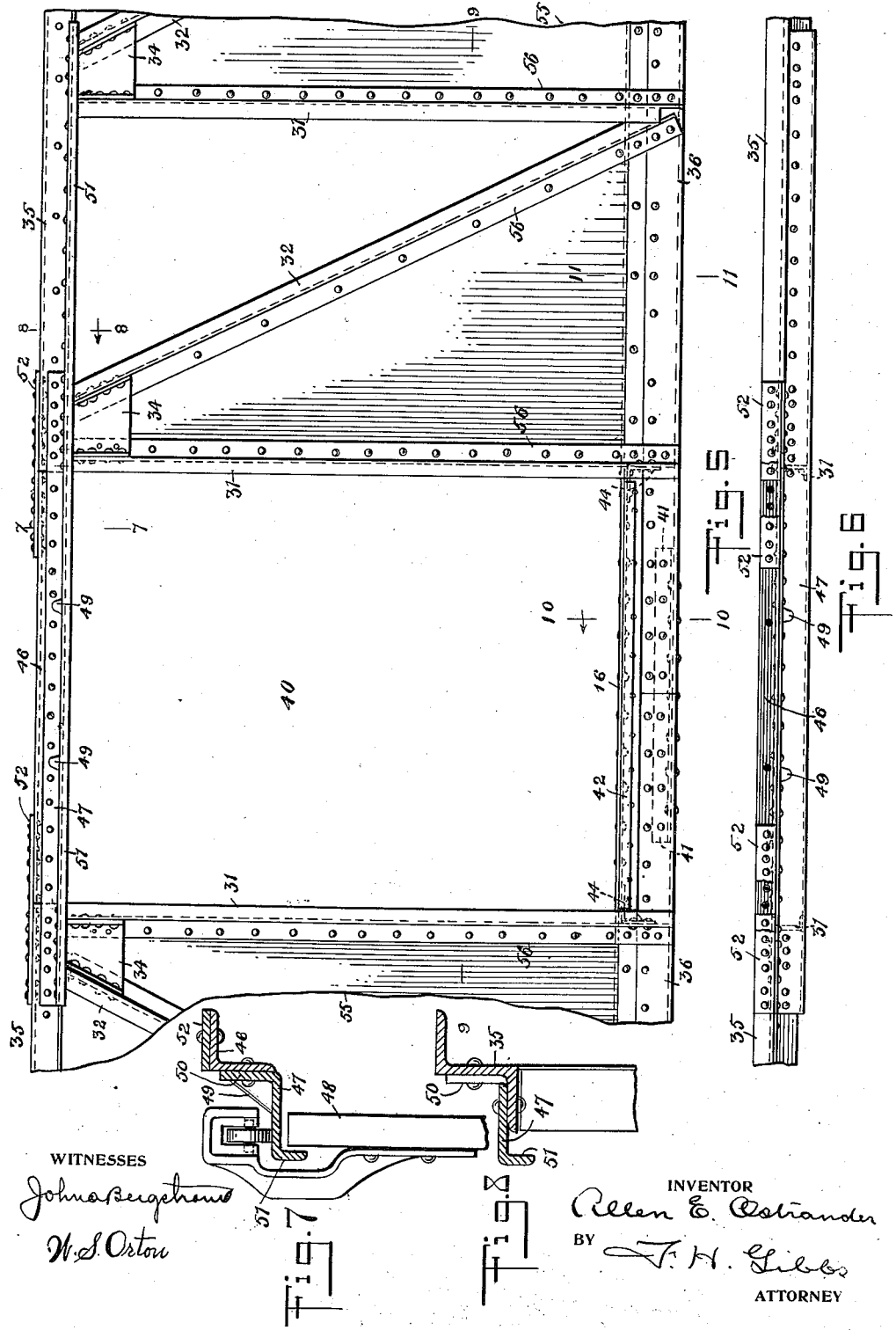

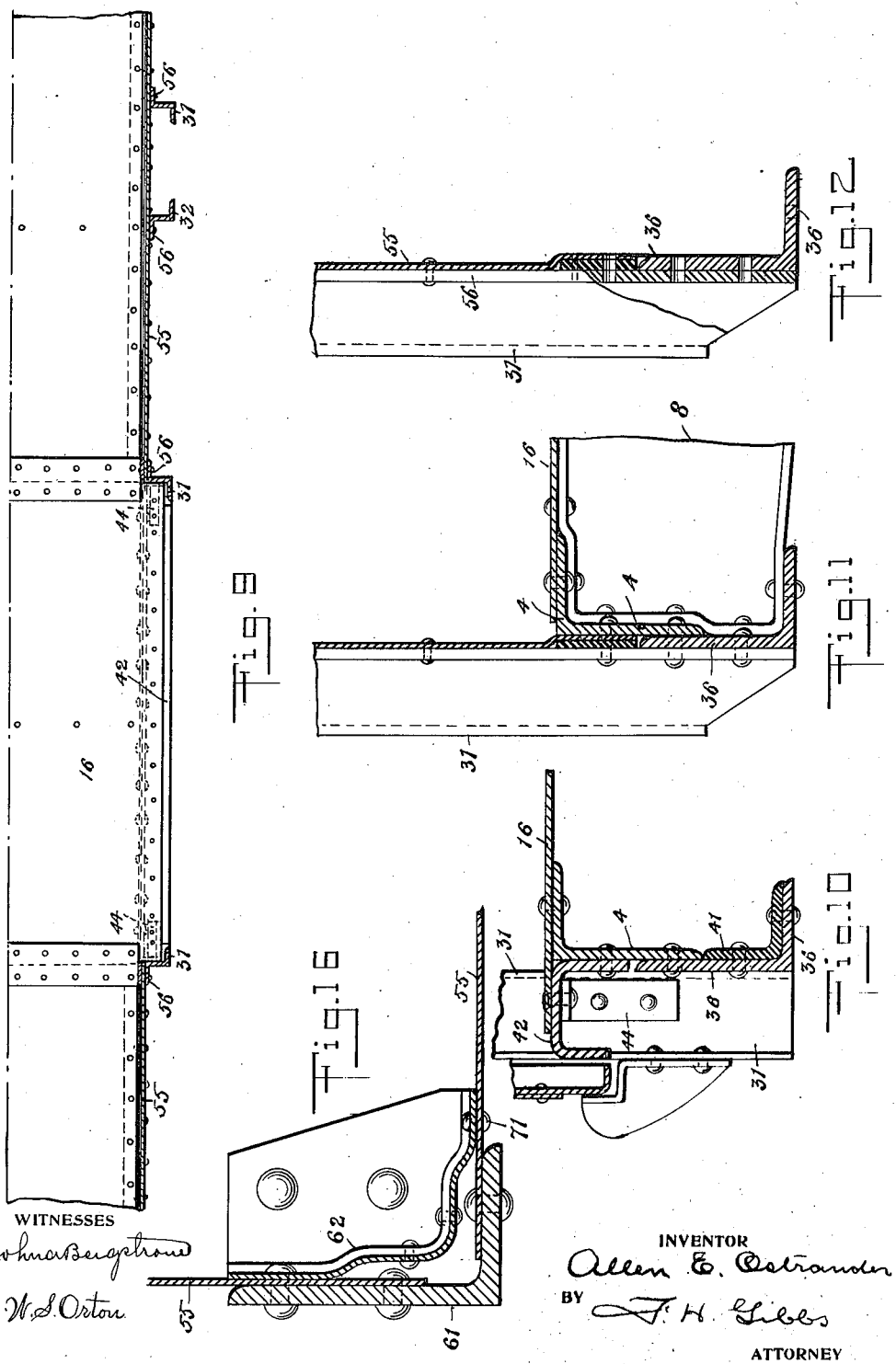

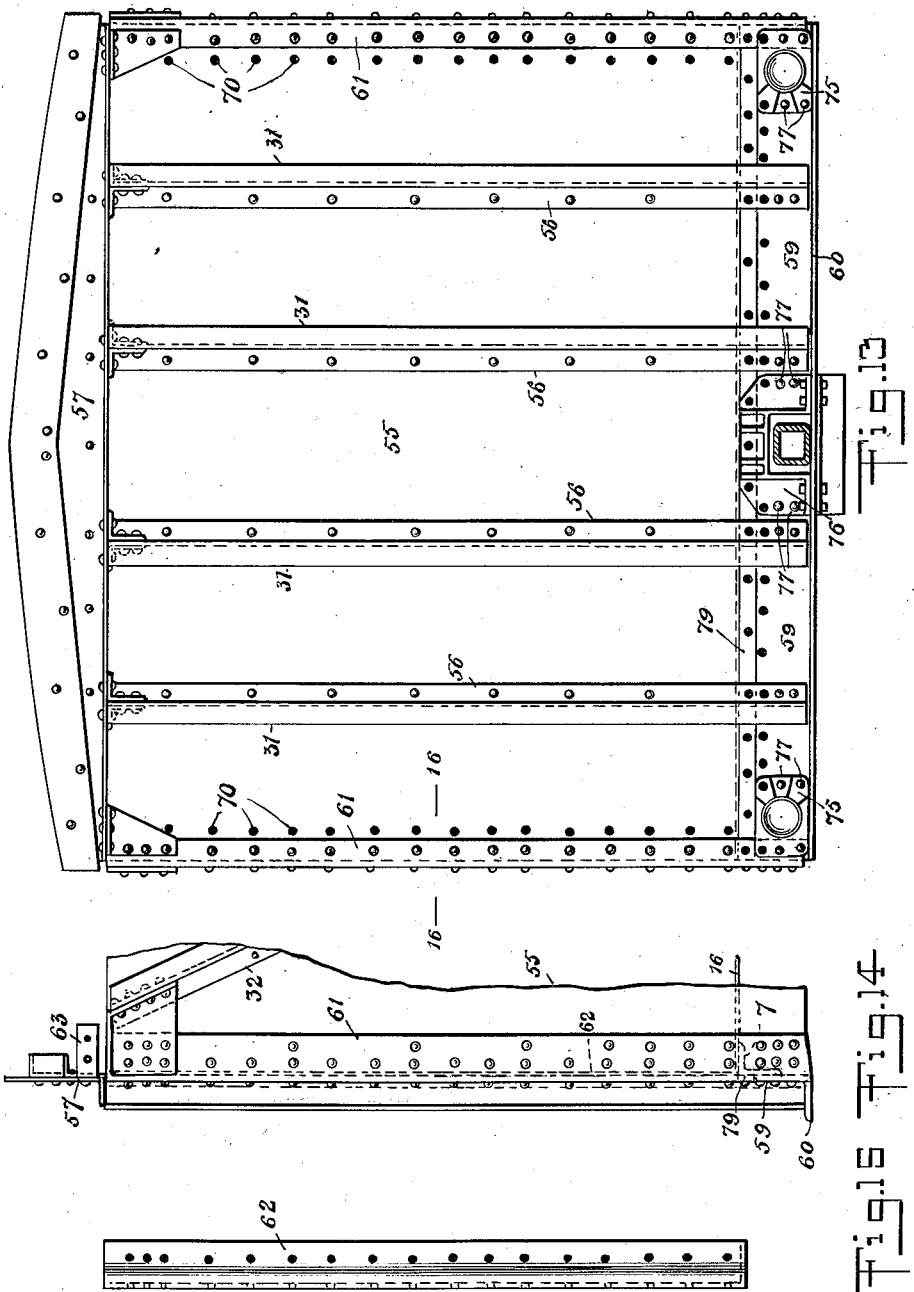

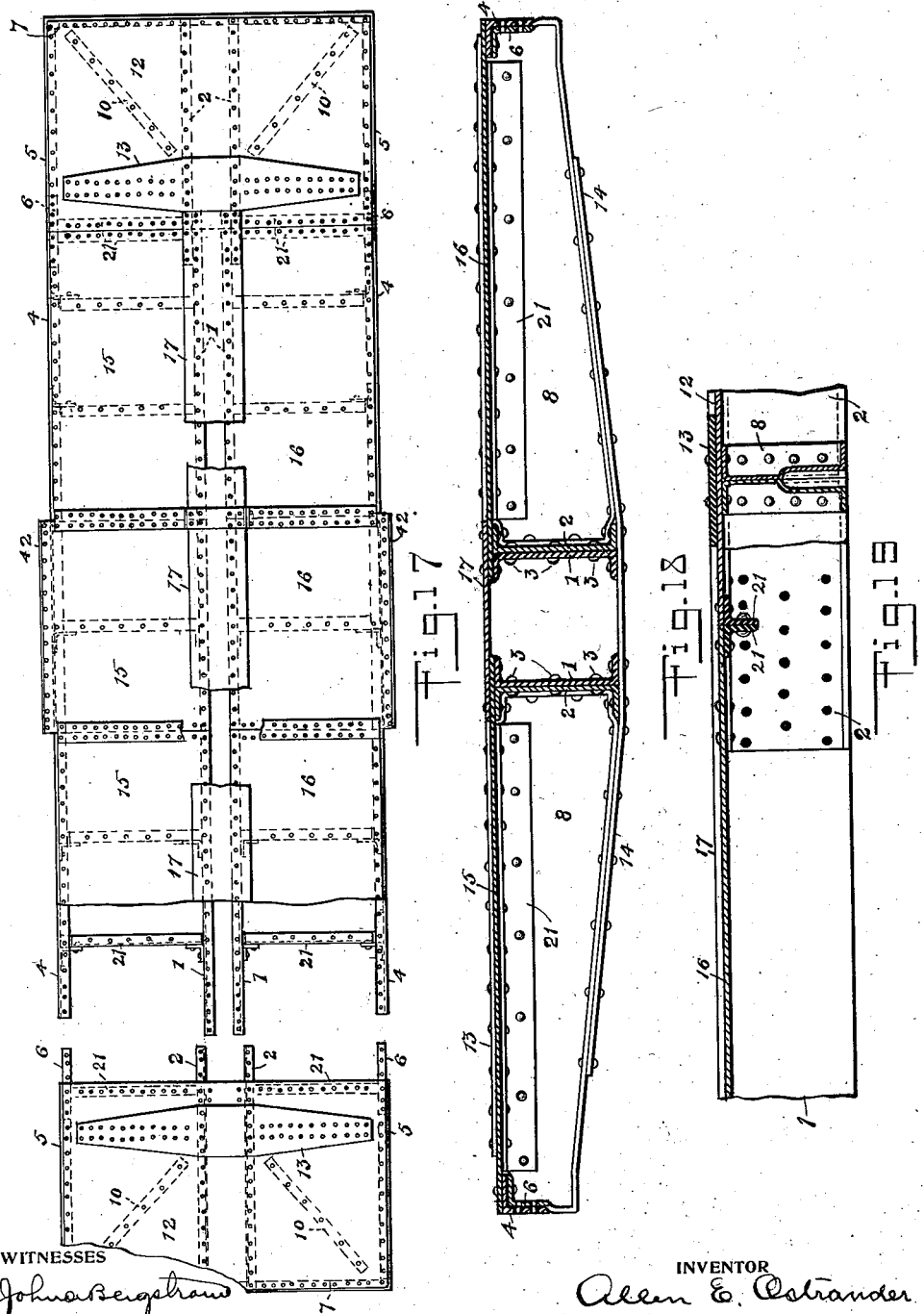

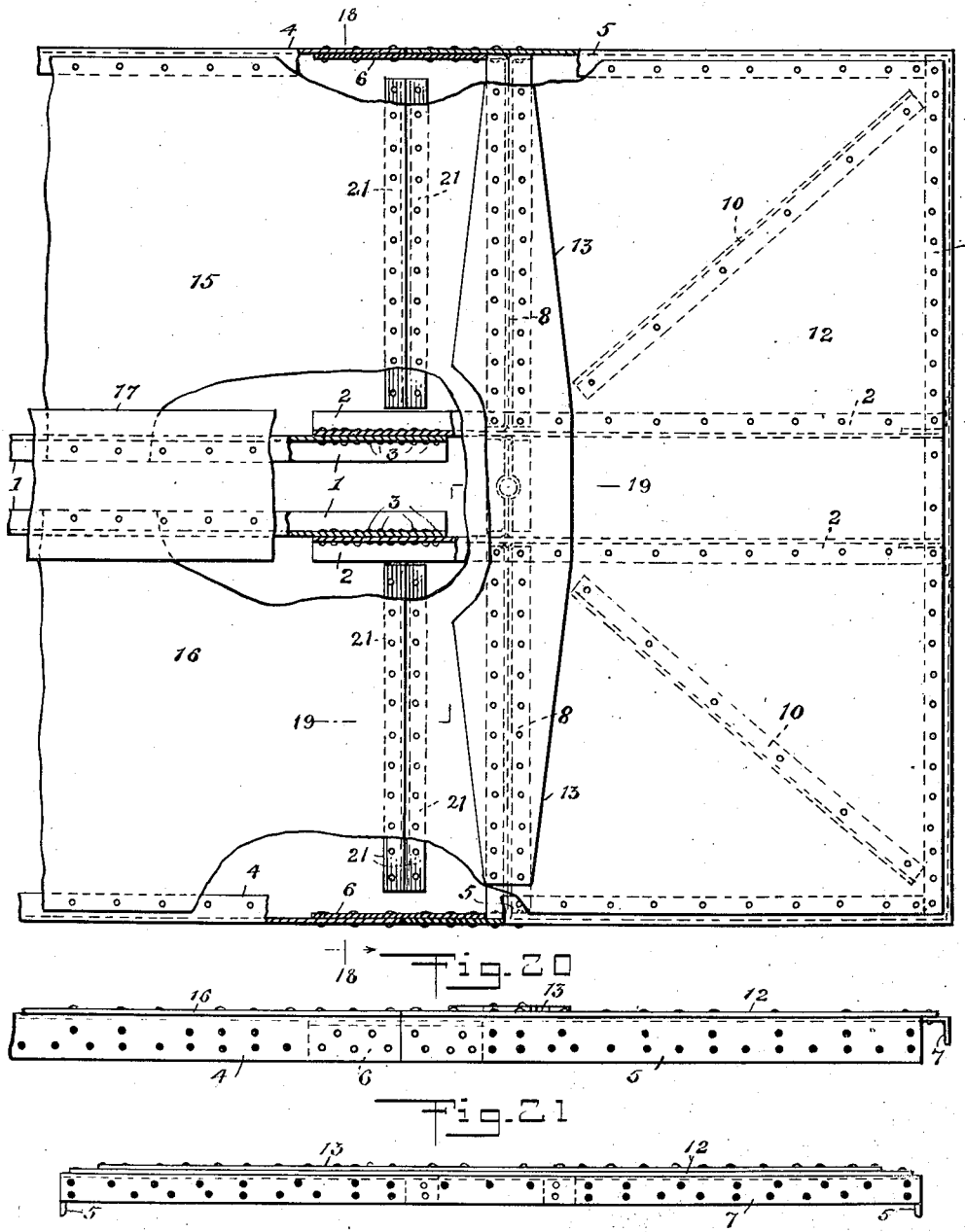

UNITED STATES PATENT OFFICE.

ALLEN E. OSTRANDER, OF RIDGEWOOD, NEW JERSEY, ASSIGNOR TO AMERICAN CAR AND FOUNDRY COMPANY, OF ST. LOUIS, MISSOURI, A CORPORATION OF NEW JERSEY.

KNOCKDOWN CAR.

1,122,411.          Specification of Letters Patent.          Patented Dec. 29, 1914.

Application filed July 3, 1912. Serial No. 707,592.

*To all whom it may concern:*

Be it known that I, ALLEN E. OSTRANDER, residing at Ridgewood, Bergen county, New Jersey, and being a citizen of the United States, have invented certain new and useful Improvements in Knockdown Cars, of which the following is a full, clear, and exact description, such as will enable others skilled in the art to which it appertains to make and to use the same, reference being had to the accompanying drawings, which illustrate the preferred form of the invention; though it is to be understood that the invention is not limited to the exact details of construction shown and described, as it is obvious that various modifications thereof will occur to persons skilled in the art.

In said drawings: Figure 1 is an elevational view of a completed car. Fig. 2 is an elevational view of the principal frame members of one side of the car with the inner sheathing in position. Fig. 3 is reproduction on a larger scale of the right-hand portion of the structure shown in Fig. 2. Fig. 4 is a plan view of the structure shown in elevation in Fig. 3. Fig. 5 is an enlarged fragmentary reproduction of one side wall, including the door framing and splice members, hereinafter more specifically described. Fig. 6 is a plan view of the structure illustrated in Fig. 5, with parts of the splice plates broken away. Fig. 7 is a vertical sectional view, the section being taken on line 7, 7 of Fig. 5. Fig. 8 is a similar section taken on line 8, 8 of Fig. 5, and looking in direction of arrow. Fig. 9 is a view showing in horizontal section the side wall construction near the door and showing in plan view a part of the flooring of the car, the section being taken on line 9, 9 of Fig. 5. Fig. 10 is a vertical sectional view, the section being taken on line 10, 10 of Fig. 5. Fig. 11 is a similar view, the section being taken on line 11, 11 of Fig. 5 through the side wall, showing the connection of said side wall to a contiguous part of the underframe, and Fig. 12 is a view taken on the same section through the side wall, with the underframe parts detached. Fig. 13 is an end elevational view of the car. Fig. 14 is a fragmentary view of a portion of the end of the side wall looking from the right-hand side of Fig. 13, and is an amplification of the left-hand end of Fig. 1. Fig. 15 is a detached elevational view of a pressed corner post, which is positioned within the corner angles, forming the outer corner posts of the car, and Fig. 16 is a horizontal sectional view taken on line 16, 16 of Fig. 13, the section being taken through the corner angle, through the end sheathing and side sheathing and through the inner corner post. Fig. 17 is a plan view showing the arrangement of the parts of the underframe; the floor sheets, the transversely extending splice plates, the bolster cover plates and the center sill cover plate, parts being broken away for clearness of illustration, and the left-hand portion of the underframe being separated to show the manner of connection of the two end portions of the underframe with the middle portion of said underframe. Fig. 18 is a transverse sectional view taken on line 18, 18 of Fig. 20. Fig. 19 is a longitudinal sectional view projected in two planes on the line 19, 19 of Fig. 20. Fig. 20 is a reproduction on a larger scale of the right-hand end portion of Fig. 17, with parts of the floor plates broken away and with portions of the center sills and side sills in section. Fig. 21 is a side elevational view of the structure shown in Fig. 20, and Fig. 22 is an end elevational view of the end sill of the car.

The form and location of the several parts entering into the car forming the subject-matter of this application will be hereinafter more fully described.

The principal object of the invention is to produce a vehicle of the box-car type, adapted for use on railroads where it is finally erected, comprising principally commercially rolled members which are easily obtained in the open market for use in the event of repairs, and with the parts entering into the structure so arranged and proportioned that the car may be temporarily assembled in the shops of the car builder for inspection, after which the car may be separated into a multitude of composite units, which are so arranged that they may be packed for shipment in the holds of seagoing vessels for transportation to the country where the cars are to be used, and for transportation, if necessary, in detached composite units for land shipment to the point of final erection and service.

It is well known that a large number of rivets can be driven either by machine or otherwise in the shop of a manufacturer properly equipped for this service in a more economical manner than such rivets can be driven in the field, or a point remote from the shops of the car builder, where only hand-operated tools are available. In consequence of this, it is one of the objects of the present invention to assemble the composite units in the shops and there drive as many rivets as possible consistent with the subsequent manipulation of the parts or fashioning of the car where it is to be used.

It is practically impossible to load into the hold of a vessel an entire car adapted for service as a box car or goods wagon on commercial railroads, and where the car parts must be shipped overland prior to the laying of tracks, it is evident that the car must be transported in fragments as small as is consistent with the structure to be finally produced. To that end I have designed a car consisting of four major divisions, the first of which is the underframe, the second the body framing, the third the metal sheets used to form the floor and side walls of the car, and fourth the roof construction.

As the roof forms no part of the present invention, I will state generally that this is formed preferably of metal secured to longitudinal and transverse roof framing members which are commonly used in box-car construction. The underframe is formed and shipped in three principal divisions indicated in Fig. 17, these divisions comprising two end sections, one of which is shown detached at the left-hand portion of Fig. 17, and the central section shown in said Fig. 17 with parts of the plates broken away to better illustrate the connection of parts of the structural members of the underframe. It is to be noted that the floor plates form a part of the underframe merely because they are connected by suitable rivet connection with the structural members of the underframe and are shipped with said structural members.

Referring particularly to the underframe construction, it will be observed that the center sills 1 are formed of commercially rolled channels, which are spliced to the draft sills 2, which they overlap, by rivets 3 projected through the webs of the center sills and the draft sills. The draft sills are pressed channel sections with their flanges projecting in a direction opposite to that of the center sills, so as to bring the web plates of the draft sills and center sills together, as best shown in the sectional view, Fig. 18.

In transverse alinement with the splice of the center sills and draft sills, the principal side angles 4 and 5 are correspondingly spliced, the angles being riveted together, the connection being established through splice plates 6, as shown in dotted lines at the right-hand side of Figs. 1 and 17 and in section in Fig. 20.

The end sections of the underframe consist of the pressed metal draft sills 2, before referred to, angles 5 at the sides and transversely extending end sill angles 7, with which they are associated, body bolsters 8, comprising pressed diaphragms or rolled structural members, or cast members, as may be desired, extending from the central sills and connected with said angles 5, with which are associated diagonal braces 10, which extend from the connection of the bolster with the central sills diagonally outwardly to the corners of the car, all of the members of the end section being united by the floor plates 12, which floor plates are riveted to the inwardly extending flanges of the angle 5, to the top flanges of the central draft sills, to the inwardly projecting flanges of the end sill, and to the horizontal flanges of the diagonal brace angles 10. Over the floor above the bolster there is provided a top bolster cover plate 13, which unites the parts of the bolster projecting laterally from the central draft sills and serves as a reinforce therefor. The bolster is preferably provided also with a bottom tie plate 14 for well understood purposes.

Between the end sections just described, the central or intermediate portion of the underframe is formed with floor sheets 15 and 16, which extend from the sides of the car toward the center line sufficiently far to overlap the top flanges of the center sills, with which said floor plates are connected by direct rivet connection, which is supplemented by a longitudinally extending center sill cover plate, which extends continuously from the rear edge of one bolster cover plate 13 to the corresponding edge of the opposite bolster cover plate 13 at the opposite end of the car, and it is to be noted that the floor plates 15 and 16 and the center sill cover plate 17 serve as an additional means for splicing or connecting the draft sills to the center sills before referred to, as said floor plates and sill cover plate cover the lapping portions of said central sill members 1 and 2. The floor plates at the ends of the middle portion of the underframe overlap the side angles 4 and 5, and serve as an additional reinforce at that connection, this connection or splice being supplemented by the angle plate 6, before referred to.

At convenient points throughout the length of the middle portion of the car, the floor sheets are connected by butt joints; that is, the edge of one sheet abutting the edge of the next sheet just back of the bolsters; that is, at the inner edges of the end plates 12, said plates are connected to the next adjacent plates by means of commercially rolled angles 21. (See Fig. 19). The horizontal legs of these angles are riveted to the floor sheets 15, 16 and 12, and are closely juxtaposed, and the vertical legs of said angles are secured together by through rivets uniting said angles and through said angles uniting the floor sheets before referred to. At other points, if desired, the abutting edges of sheets 15, 15 and 16, 16 may be connected by splice plates overlapping the meeting edges of such floor plates.

As before indicated, the side framing of the car on each side is formed of two principal composite units, which are shown assembled in Fig. 2, one of which is shown in enlarged detail in Fig. 3. As a description of one of these units will apply to all, particular reference is here made to Fig. 3. By referring to Fig. 1 in comparison with the structure of Fig. 3, it will be noted that the vertical post 30 is positioned in alinement with the body bolster before referred to as forming a part of the underframe. This post 30 is formed of a commercially rolled Z-section, and likewise the other vertical posts 31 and the diagonal braces 32 are all commercially rolled Z-sections, which are properly connected at their top by angular gusset plates 33 and 34, with a longitudinally extending Z-shaped rolled section 35, which section 35 forms what is commonly known as the side plate of the car-body. The side plate 35, like the bottom angle 36, which is formed as a part of the car wall, is discontinuous. The side plate 35, however, terminates in alinement with the inner edge of the vertical post 31, which, with its companion post 31 at the opposite side of the door opening 40, serves as a part of the door frame. The bottom angle 36 extends, as shown in Fig. 5, below this door opening 40, and to the middle portion thereof, where it meets a corresponding angle projecting from the opposite end of the car, these bottom angles 36 being spliced and secured together by a supplemental rolled angle shape 41, which, as shown in Fig. 10 in full lines and in Fig. 5 in dotted lines, is riveted to the vertical and horizontal legs of the meeting angles 36, before referred to, and within the door opening there is also provided a supplemental brace and splicing member 42, which is preferably formed from a bent plate of substantially inverted U-shape, as best shown in section in Fig. 10, and it is to be noted that within the space occupied by the door opening, the floor sheets 15 and 16 project outwardly, as shown in Fig. 10, so as to overlap and reinforce the member 42, and said reinforcing member and the projecting ends of the floor sheet 16 are reinforced and supported in position by angle brackets 44, (see Fig. 10), which angle brackets are riveted directly to the web of the posts 31. The pressed reinforcing plate 42 is indicated in dotted lines in Fig. 9.

Referring to Figs. 5, 6, 7 and 8 it is to be noted that the side plates 35 terminate at the door posts 31, and spanning the door opening is a rolled angle section 46. Lapping the side plates 35 and connected directly to said side plates 35 and said angle 46 is a Z-shaped section 47, which serves as a track or support, upon which is mounted the running gear or bracket of the sliding door 48. The member 47 is preferably formed from a pressed plate, which is embossed as shown at 49 at convenient intervals to stiffen said plate, and it is to be noted that the vertical leg 50 is wider than the outstanding vertical leg 51, so as to afford sufficient area to permit proper rivet connection of said portion 50 with the side plates 35 and with said angle 46, before referred to.

Supplementing the splice connection formed by the member 47, before referred to, the angle 46 is connected with the side plates 35 by a pair of splice plates 52, one at each side of the middle portion of the door opening, and said splice plates 52 are secured by direct rivet connection with the top flanges of the angle 46. This splicing of the bottom angles 36 and the top members 35, or side plates, permits the manufacturer to form the side walls of the car as indicated, each side being formed of the two principal frame sections, which are united as described, and the member serving as a splice, or connector (the member 47), serves as a support or trackway for the sliding door of the car, and as the upper chord or member 35 is in compression, it is evident that the angle 46 being interposed, as shown in Fig. 5, serves as a sufficient reinforce when united to the other parts, as hereinbefore described.

To stiffen the side framing, the flanged gusset plates 34 are riveted through their outstanding flanges directly to the webs of the Z-shaped members 31 and 32, and are also connected by direct rivet connection with the outstanding flange of the side plate 35, before referred to, as best shown in Fig. 3. This is also true of the triangular gusset 33, which unites the post 30 with said side plate 35. At the bottom said side posts and diagonals 30, 31 and 32 are riveted directly to the side angles 36, and intermediate the members 35 and 36, sheathing 55 is secured by direct rivet connection to the flanges 56 of the said Z-shaped side frame members.

Referring now to Figs. 13, 14 and 15: Referring to the details illustrated in these figures, it is to be noted that the angle 7, before referred to, is directly connected with the angle member 59, provided with outstanding flanges 60, and the vertically disposed Z-sections 56 are directly connected with the angle 7 and the angle 59 at the bottom, and are connected with the side plate 57 at the top. Lapping the end walls 55 and side walls of the car are corner angles 61, within which angles 61 are positioned vertical posts 62, between which members 61 and 62 the wall plates 55 are extended, as shown in Fig. 16, and said wall plates are connected directly to the angles 61, being also connected with said posts 62. Connecting the end plate 57 with the side plates 35 are angle brackets 63, which are riveted directly to the end plates 57 and to the vertical webs of the angle plates 35.

In Fig. 13 the rivets connecting the end wall 55 and the vertical members are shown in position, and the rivet openings 70 are shown in the plates 55, through which are projected the rivets 71 used to connect the wall 55 with the posts 62.

Shipped with the end wall are the push pole pockets 75 and the striking casting 76, and it is to be noted that the rivets passing through the flanges of said push pole pockets and striking casting and through the angle 59, are shown in the drawing as in position. To be more specific, the rivets 77 are shown in position, while the rivets in the two horizontal lines above the space occupied by the rivets 77 are omitted. This for the reason that such omitted rivets when placed in position will pass through the vertical leg of the angle 7, which is shipped as a part of the underframe, and said rivets connecting the push pole pockets and angle 7 are left to be driven in the field.

As the large angle 59 is riveted directly to the outer face of the angle 7 of the underframe, it is necessary to supply a filler strip, which is indicated at 79 in Fig. 13, to provide a flush service between the end wall 55 and the outer face of the bottom angle 59.

What I claim is:

1. A knock-down car comprising major portions including a divided underframe, a body framing including walls, said underframe including two ends and a central section, the said walls including a pair of end walls and a pair of side walls, each of said side walls including two combinations of elements, all of said portions being adapted to be assembled with a minimum number of fastening parts to form a car.

2. A railroad car, comprising a plurality of shipping parts, said parts comprising a pair of one-piece end walls, two pairs of side walls and a three-section underframe, each section carrying a section of the car floor.

3. A railroad car, comprising a plurality of shipping parts, said parts comprising a pair of one-piece end walls, two pairs of side walls and a three-section underframe, each section carrying a portion of the car floor, and means carried by said parts for uniting the same to form the completed car.

4. In a car, the combination of a plurality of shipping units, said units comprising a pair of end walls each including an end plate and body posts and a pair of side walls, each side wall including a discontinuous side wall and bottom angle, and means uniting said plates and angles to form the side walls and means uniting the units to form a car wall.

5. A side wall for cars including a discontinuous side plate, a door lintel uniting said side plate, a discontinuous bottom angle, a portion of which constitutes the bottom door forming member, means uniting the parts of said angle and braced sheeting connecting said side plate at said angle to form said wall portions on opposite sides of the door.

6. In a car, the combination of a side plate, a sill extending parallel with and beyond one end of said plate, a door side forming post connecting said end of the side plate with said sill intermediate of its length, the extension of said sill forming a bottom door frame member and a lintel member attached to said plate.

7. In a knock-down car, a three-part underframe, means fastening said parts in position, in combination with a two-part side wall, means for fastening said side wall in position in staggered relation relative to the fastening means between the underframe sections, whereby the fastened portions of the car are spaced longitudinally along the length of the car.

8. In a knock-down car comprising a divided underframe and a divided side wall, the dividing line between the parts of said underframe being spaced longitudinally from the dividing line between parts of the wall, whereby in the completed car there is a continuous longitudinal member passing through all transverse planes.

9. As an article of manufacture, a single side sheeting, a side plate bounding the upper edge of said sheeting and of a length substantially equal to the length of said edge, a side angle bounding the lower edge of said sheet and extending beyond the same to form a portion of a door frame.

10. In a car wall, a pair of spaced apart posts forming part of a door frame, a side plate extending outwardly from each post, a member connecting said posts and forming a continuation of each of said plates and a part of the door frame, and a bottom angle projecting from each post toward the other to form a bottom member of the door frame.

11. In a car construction, a two-part bottom angle, an angle connecting the parts of said bottom angle, a pair of side angles, one connected to each part of said bottom angle and a supplemental brace and splice member connecting the parts of said side angle.

12. In a car, a discontinuous bottom angle, a section uniting the adjacent ends of said angle and a floor plate forming an additional connecting means for said bottom angle.

13. In a car, a door frame composed of side posts, of adjacent ends of a discontinuous bottom angle, a connecting member for said angle forming a bottom door frame member, a floor plate projecting over said member and between said posts and a top door frame member.

14. In a car construction, the combination of a side plate comprising spaced apart members, a Z-section connecting said members, said section having a flange adapted to support door roller mechanism and a depending flange adapted to guide a door in position.

15. In a car, a side plate comprising spaced apart members, an angle connecting said members, a pair of spaced splice plates, one securing each end of said angle with the adjacent end of one of said members.

In witness whereof I have hereunto set my hand in the presence of two witnesses.

ALLEN E. OSTRANDER.

Witnesses:
GEORGE F. MAUD,
R. H. DAVENPORT.